(12) United States Patent
Liu (10) Patent No.: US 10,377,301 B2
(45) Date of Patent: Aug. 13, 2019

(54) LAMP LIGHT CONTROL METHOD AND APPARATUS, COMPUTER STORAGE MEDIUM AND IN-VEHICLE DEVICE

(71) Applicant: Tencent Technology (Shenzhen) Company Limited, Shenzhen, Guangdong (CN)

(72) Inventor: Jie Liu, Guangdong (CN)

(73) Assignee: Tencent Technology (Shenzhen) Company Limited, Shenzhen, Guangdong (CN)

(*) Notice: Subject to any disclaimer, the term of this patent is extended or adjusted under 35 U.S.C. 154(b) by 0 days.

(21) Appl. No.: 16/020,186

(22) Filed: Jun. 27, 2018

(65) Prior Publication Data

US 2018/0319324 A1    Nov. 8, 2018

Related U.S. Application Data

(63) Continuation of application No. PCT/CN2017/102140, filed on Sep. 18, 2017.

(30) Foreign Application Priority Data

Sep. 22, 2016 (CN) .......................... 2016 1 0842803

(51) Int. Cl.
*H05B 33/08* (2006.01)
*B60Q 1/34* (2006.01)
(Continued)

(52) U.S. Cl.
CPC .......... *B60Q 1/346* (2013.01); *G08G 1/0112* (2013.01); *G08G 1/0962* (2013.01);
(Continued)

(58) Field of Classification Search
CPC .... B60Q 1/346; G08G 1/0112; G08G 1/0962; G08G 1/0968; H05B 37/02; H05B 37/0227; H05B 37/0272
(Continued)

(56) References Cited

U.S. PATENT DOCUMENTS

2013/0158811 A1    6/2013 Fu
2015/0051826 A1*   2/2015 Basson ............. G01C 21/3697
                                                        701/437
(Continued)

FOREIGN PATENT DOCUMENTS

CN    104680841 A    6/2015
CN    104777823 A    7/2015
(Continued)

OTHER PUBLICATIONS

International Search Report for International Application No. PCT/CN2017/102140 dated Dec. 26, 2017; 10 pages.
(Continued)

*Primary Examiner* — Jimmy T Vu
(74) *Attorney, Agent, or Firm* — Brinks Gilson & Lione (57) ABSTRACT

A lamp light control technical solution includes obtaining current location information of a vehicle, obtaining a control instruction determined based on predetermined information and a predetermined control rule, where the predetermined information at least including information determined according to the current location information, and the predetermined control rule including a correspondence between the predetermined information and the control instruction. The lamp light control technical solution further includes executing the control instruction, to control lamp light of the vehicle. A computer storage medium and an in-vehicle device for implementing the lamp light control are also provided.

18 Claims, 6 Drawing Sheets

(51) Int. Cl.
*H05B 37/02* (2006.01)
*G08G 1/01* (2006.01)
*G08G 1/0962* (2006.01)
*G08G 1/0968* (2006.01)

(52) U.S. Cl.
CPC ........... *G08G 1/0968* (2013.01); *H05B 37/02* (2013.01); *H05B 37/0227* (2013.01); *H05B 37/0272* (2013.01)

(58) Field of Classification Search
USPC .................................. 315/77, 291, 307, 308
See application file for complete search history.

(56) References Cited

U.S. PATENT DOCUMENTS

| | | | |
|---|---|---|---|
| 2015/0148985 A1 | 5/2015 | Jo | |
| 2018/0093604 A1* | 4/2018 | George | ................ B60Q 1/0023 |

FOREIGN PATENT DOCUMENTS

| | | |
|---|---|---|
| CN | 104999956 A | 10/2015 |
| CN | 105522954 A | 4/2016 |
| CN | 105730444 A | 7/2016 |
| DE | 10 2012 018 488 A1 | 3/2014 |
| JP | 2009-58799 A | 3/2009 |
| KR | 1020120113143 A | 10/2012 |

OTHER PUBLICATIONS

Office Action and Search Report in Chinese Application No. 201610842803.0, dated Dec. 28, 2018, pp. 1-6.

* cited by examiner

LAMP LIGHT CONTROL METHOD AND APPARATUS, COMPUTER STORAGE MEDIUM AND IN-VEHICLE DEVICE

CROSS-REFERENCE TO RELATED APPLICATION(S)

This application is a continuation of International Patent Application No. PCT/CN2017/102140, filed Sep. 18, 2017, which claims priority to Chinese Patent Application No. 201610842803.0, filed on Sep. 22, 2016, the entirety of all of which are incorporated by reference herein.

FIELD OF THE TECHNOLOGY

The present disclosure relates to the field of electronic technologies, and in particular, to a lamp light control method and apparatus, a computer storage medium, and an in-vehicle device.

BACKGROUND OF THE DISCLOSURE

Various vehicles, for example, cars, electric motorcycles, and electric scooters, are usually provided with lamp light. Generally, lamp light is manually controlled by a user. Problems that may be caused when the user manually controls the lamp light include:

The user forgets to turn on corresponding lamp light, causing a traffic accident.

The user needs to remember a rule for turning on the lamp light, so that it is difficult for the user to control the lamp light; and if the user remembers the rule wrongly, lamp light control may be caused to be chaotic, and a traffic accident may be caused likewise.

SUMMARY

In view of this, an objective of embodiments of the present disclosure is to provide a lamp light control method and apparatus, a computer storage medium, and an in-vehicle device, to at least resolve some of the problems. The technical solutions of the embodiments of the present disclosure are implemented as described herein.

A first embodiment provides a lamp light control method, including obtaining current location information of a vehicle, obtaining a control instruction determined based on predetermined information and a predetermined control rule, the predetermined information at least including information determined according to the current location information, and the predetermined control rule including a correspondence between the predetermined information and the control instruction, and executing the control instruction, to control lamp light of the vehicle.

A second embodiment provides a lamp light control apparatus, where the apparatus includes a locating unit configured to obtain current location information of a vehicle, an obtaining unit configured to obtain a control instruction determined based on predetermined information and a predetermined control rule, where the predetermined information at least including information determined according to the current location information, and where the predetermined control rule including a correspondence between the predetermined information and the control instruction, and an execution unit, configured to execute the control instruction, to control lamp light of the vehicle.

A third embodiment provides a computer storage medium, a computer executable instruction being stored in the computer storage medium, and the computer executable instruction being used for performing the foregoing lamp light control method.

An embodiment provides an in-vehicle device, including a storage medium, configured to store computer executable instructions, and a processor, connected to the storage medium, and configured to perform a foregoing lamp light control method disclosed herein by executing the computer executable instructions.

A lamp light control method and apparatus provided in the embodiments of the present disclosure may at least obtain current location information of a vehicle, determine a control instruction based on predetermined information that includes information determined based on the current location information and a predetermined control rule, and automatically control lamp light of the vehicle according to the control instruction. In this way, the lamp light of the vehicle is automatically controlled. A driver does not need to manually control the lamp light, thereby reducing operation difficulty for the driver and reducing a fatigue degree of the driver. Meanwhile, the lamp light is prevented from being wrongly operated due to a miss-operation of the driver, thereby improving control precision. In addition, the driver may correctly use the lamp light without being familiar with a lamp light control rule, thereby reducing a traffic accident caused by a miss-operation of the lamp light, and improving driving safety.

DETAILED DESCRIPTION

The following further describes the technical solutions of the present disclosure with reference to the accompanying drawings and specific embodiments. It should be understood that, preferred embodiments described below are merely for illustration and explanation of the present disclosure, but not for limiting the present disclosure.

Figure 1:
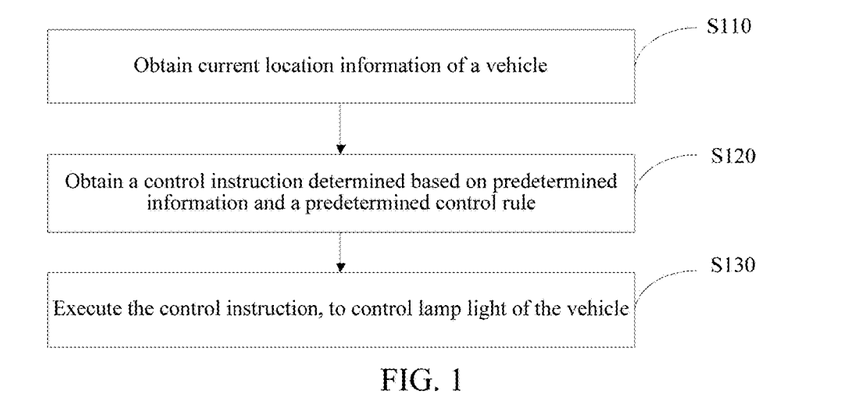
FIG. 1 is a schematic flowchart of a first lamp light control method according to an embodiment.

As shown in FIG. 1. this embodiment provides a lamp light control method, including:

Step S110: Obtain current location information of a vehicle.

Step S120: Obtain a control instruction determined based on predetermined information and a predetermined control rule. The predetermined information at least includes information determined according to the current location information, and the predetermined control rule includes a correspondence between the predetermined information and the control instruction.

Step S130: Execute the control instruction, to control lamp light of the vehicle.

The lamp light control method described in this embodiment may be used for a control method of controlling various lamps on the vehicle, such as a control method of controlling a headlamp, a tail lamp and/or a side lamp. The headlamp is a lamp located on the head of the vehicle, and the tail lamp may be a lamp located on the rear of the vehicle. The side lamp may be a lamp located on a side of the vehicle.

Obtaining current location information of the vehicle in this embodiment may include: using a global positioning system (Global Positioning System, GPS) for locating. Alternatively, various locating manners such as base station auxiliary positioning may be used for locating.

The current location information is provided first in this embodiment. The current location information may be latitude and longitude, or may be a complete address of each position that can represent information of a current location of the vehicle.

In step S120, the control instruction is determined based on the predetermined information and the predetermined control rule. The predetermined information herein includes at least one or more pieces of information determined according to the current location information. In conclusion, the predetermined information may be various information affecting lamp light control of the vehicle. For example, the vehicle is at different locations. At different locations, road information is different, and weather information and traffic status information may also different.

The predetermined control rule may be a control rule of controlling various lamps of the vehicle to turn on/off. For example, a car includes a headlamp, a tail lamp, a hazard warning signal lamp, a turn lamp, and a fog lamp. Each lamp herein corresponds to a scenario for using the lamp. In the predetermined control rule in this embodiment, specific application scenarios of various lamps may be limited. In conclusion, the lamp light control in this embodiment includes control of lighting lamps and/or control of various indicator lamps. The indicator lamps may include a turn lamp, hazard warning signal lamp, and the like.

In step S120, the control instruction may be obtained in various manners including at least the following manners:

First Manner:

Step S120 may include: sending the current location information to a server; and receiving the control instruction determined by the server according to the predetermined information and the predetermined control rule.

In this way, the control instruction is received from another device, and the control instruction is generated by the server.

In this manner, a server located on a network side is used to perform online control on lamp light control. In this case, a local lamp light control device on a vehicle needs to be connected to the server on the network side.

Second Manner:

Step S120 may include: an electronic device for performing the lamp light control method in this embodiment obtains the predetermined information automatically according to the current location information; and queries the predetermined control rule automatically according to the predetermined information, to determine the control instruction.

In this manner, the electronic device automatically generates a control instruction. In this case, the electronic device may generate the control instruction without being connected to a network, to implement control of lamp light.

It is offline control in this manner. An in-vehicle device on a vehicle may perform local control of lamp light according to a control rule stored thereon, so that data exchange does not need to be performed between the in-vehicle device and the server on the network side.

The in-vehicle device herein is an electronic device installed or carried on a vehicle and may be an in-vehicle navigator, or an electronic device, such as a mobile phone carried by a driver or a passenger and may communicate with a lamp light control system of the vehicle.

Third Manner:

Step S120 may further include: determining whether a geographical location corresponding to the current location information is a location that the in-vehicle device on the vehicle stores, or a geographical location that the vehicle has ever passed through, or whether a type of the geographical location of the current location information is a specific road type according to the current location information. If the current location information satisfies a predetermined local determining condition, the in-vehicle device automatically generates a control instruction according to the current location information and based on the predetermined control rule; or if not, the in-vehicle device reports the current location information to the server on the network side, so that the server generates a control instruction, and the in-vehicle device receives the control instruction from the server.

For example, if it is determined that a current road type is a specific road type such as a tunnel according to the current location information, the current location information is reported to the server on the network side, and the server on the network side in accordance with another vehicle generates an accurate control instruction, to reduce traffic accidents caused by inappropriate lamp light control as much as possible. If a type of the geographical location corresponding to the current location information is not a specific road type, the in-vehicle device may automatically control lamp light, and information exchange between the in-vehicle device and the server on the network side is reduced, so that the information exchange between the in-vehicle device and the network side is reduced, thereby reducing power consumption that would have been generated by the exchange.

The method further includes: detecting driving status information of the vehicle.

Step S120 specifically includes: obtaining the instruction determined based on the predetermined information, the driving status information, and the predetermined control rule.

Figure 2:
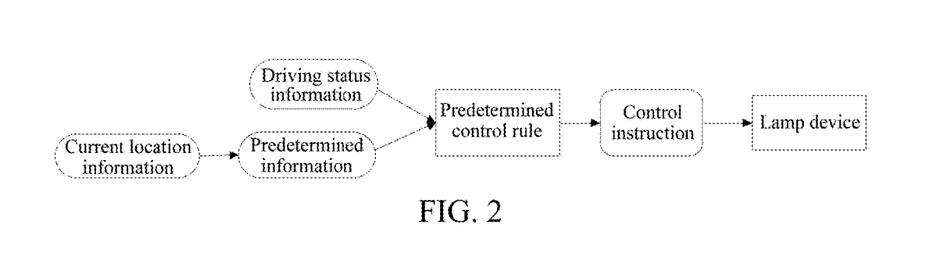
FIG. 2 is a schematic diagram of first information conversion of a lamp light control method according to an embodiment.

As shown in FIG. 2, in this embodiment, on one hand, predetermined information is obtained according to current location information; on the other hand, driving status information is obtained; then with reference to the predetermined information and the driving status information, a predetermined control rule is queried to determine a control instruction, and the control instruction is transferred to a lamp device to perform lamp light control.

The driving status information may be various information for representing driving statuses of the vehicle. For example, status information of various driving statuses: going straight, turning right, turning left, being uphill, being downhill, making a U-turn, making a stop, and/or being reversed of the vehicle may be determined according to the driving status information. In this embodiment, rotation of a steering wheel of the vehicle may be detected to obtain the driving status information, or acceleration sensors such as gyroscopes installed on the vehicle in multiple directions may be used to determine the driving status information.

Figure 3:
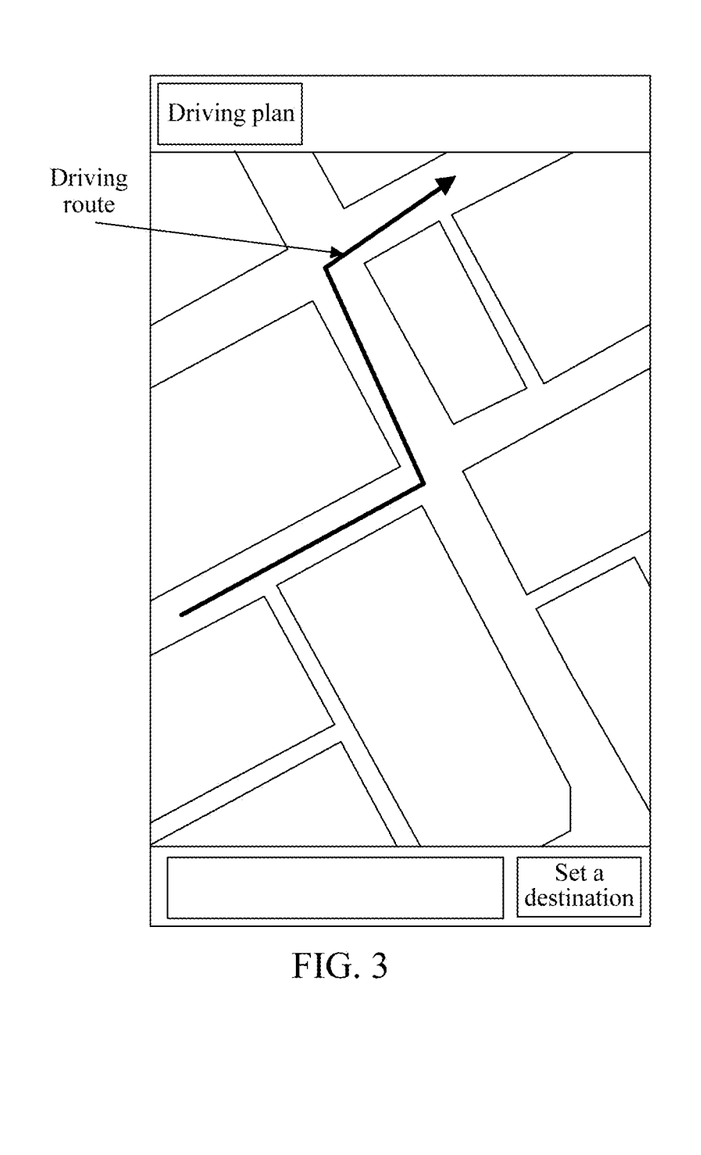
FIG. 3 is a schematic diagram of displaying a driving route according to an embodiment.

In a specific application, the method may further include: predicting driving status information at a current moment before the current moment. FIG. 3 shows a driving route planned by the vehicle for driving. In the driving route, it may be learned on which intersection the vehicle turns right, on which road section the vehicle goes straight, and on which road the vehicle turns right. Therefore, the driving status information at a current moment may be determined according to a detected historical travel speed and driving route.

In conclusion, in this embodiment, the driving status information is detected. In step S120, lamp light is automatically controlled with reference to the driving status information, to implement accurate automatic control.

In some embodiments, step S120 further includes: querying map data according to the current location information, to obtain road information; and querying the predetermined control rule according to the road information, to determine the control instruction.

The road information herein may include information for representing a road form, for example, various information such as: whether a current location is a fork in the road, whether there is a traffic light, and whether it is a bridge, tunnel, and highway. In this embodiment, the road information may be obtained by querying the map data according to the current location information. Under different road conditions, different lamp light control instructions may be required. In an example in which a current location is detected, with reference to a travel route, a tunnel is about to be entered, and a low beam lamp needs to be turned on according to a traffic rule. In this embodiment, a vehicle or an electronic device carried by the vehicle generates a control instruction for controlling lamp light, so as to control the vehicle such as a car, to turn on the low beam lamp. In this way, a driver does not need to manually control the lamp light, so that a user operation is simplified, and a phenomenon of inappropriate lamp light control caused by a human can be prevented.

In some embodiments, step S120 further includes: determining weather information of a current location of the vehicle according to the current location information; and querying the predetermined control rule according to the weather information, to determine the control instruction.

Different locations correspond to different weather. The weather information may be information used for representing weather of a current location of the vehicle. The weather information can be used for representing affection information such as visibility of various types of weather.

In this embodiment, the predetermined control rule is further queried with reference to the weather information, to control a lamp turn on function for a corresponding lamp light. In an embodiment, optionally, the road information and the weather information may be queried, to determine a control instruction. Controlling the lamp light in this way may make the road information and the weather information be considered at the same time, so that automatic and intelligent lamp light control is implemented.

In some embodiments, the predetermined information further includes current time information corresponding to a current location of the vehicle. The current time information is used for indicating a current time. Sunshine brightness is different at different times. Sunshine brightness is different, so that it can be determined whether it is daytime or nighttime at a current time, and whether lamp light is required to be turned on. For example, the embodiments may include: obtaining a current time when the vehicle obtains a current location, to presume current sunshine information according to the current time. The sunshine information may include information for representing sunshine brightness. Sunshine is different in different time periods, and different sunshine represents different brightness. It can be known which lamp light is required to be turned on according to sunshine information, and lamp light brightness may be moderately controlled.

In some embodiments, the method further includes: obtaining traffic status information of a location of the vehicle.

Step S120 may further include: obtaining the control instruction determined based on the predetermined information, the traffic status information, and the predetermined control rule, where the predetermined control rule includes a correspondence of the predetermined information, the traffic status information, and the control instruction.

In this embodiment, the method further includes: obtaining the traffic status information. In this embodiment, the obtaining the traffic status information may include: an electronic device for performing the information processing method in this embodiment obtains the traffic status information by automatically collecting images, or the current location information may be used for querying the traffic status information reported by an image collector on both sides of a road. In a specific implementation process, traffic status information collected by an image collector carried in a vehicle is preferable.

For example, a front and a rear camera are disposed on a car. Conditions of vehicles from the opposite direction and vehicles behind are collected separately, to facilitate lamp light control under conditions of meeting or overtaking.

In this embodiment, the method further includes: collecting current illumination information.

Step S120 may include: obtaining a control instruction determined based on the predetermined information, the illumination information, and the predetermined control rule.

The illumination information may include comprehensive brightness of brightness formed by sunlight, brightness formed by a road lamp, and brightness formed by moonlight.

In a specific application, the predetermined control rule may include at least a traffic rule, so that a vehicle automatically uses a high beam lamp or a low beam lamp, and controls lamp light brightness. In conclusion, in this embodiment, lamp light is further controlled with reference to the illumination information, to improve control precision.

Figure 4:
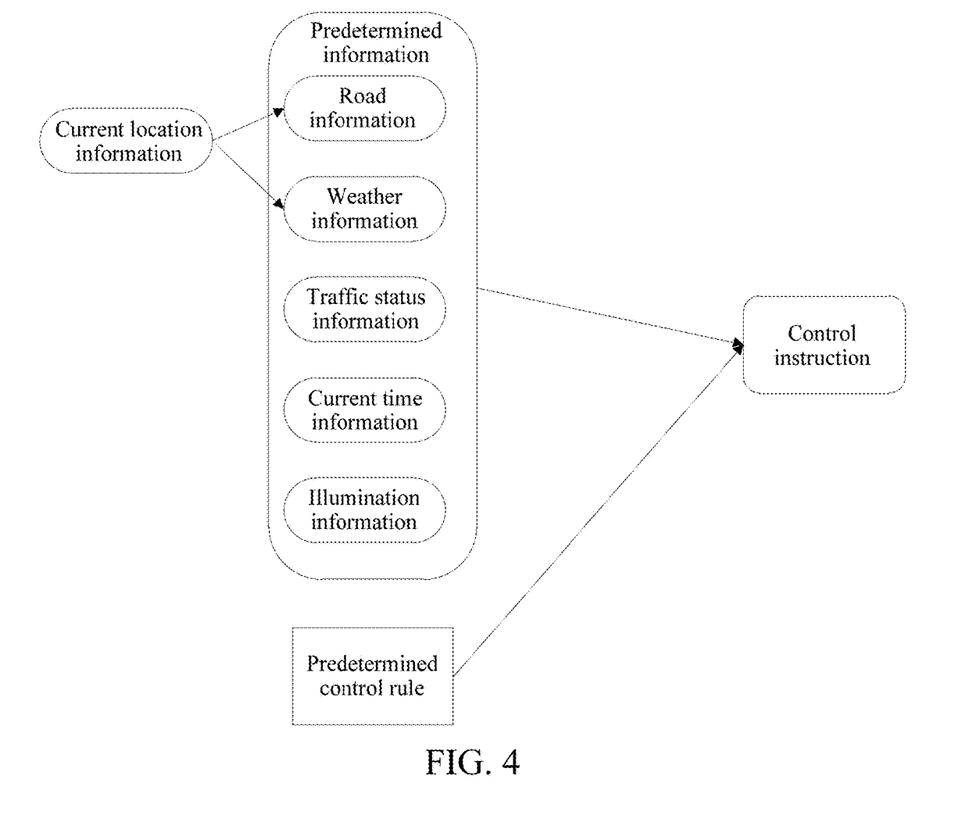
FIG. 4 is a schematic diagram of second information conversion of a lamp light control method according to an embodiment.

FIG. 4 shows a schematic diagram of information conversion of performing the lamp light control method in this embodiment. First, road information and weather information may be at least obtained according to current location information, and then with reference to predetermined information jointly formed by traffic status information, current time information, illumination information, and the like and a predetermined control rule, to generate the control instruction, so as to control lamp light of a vehicle by using the control instruction.

Figure 5:
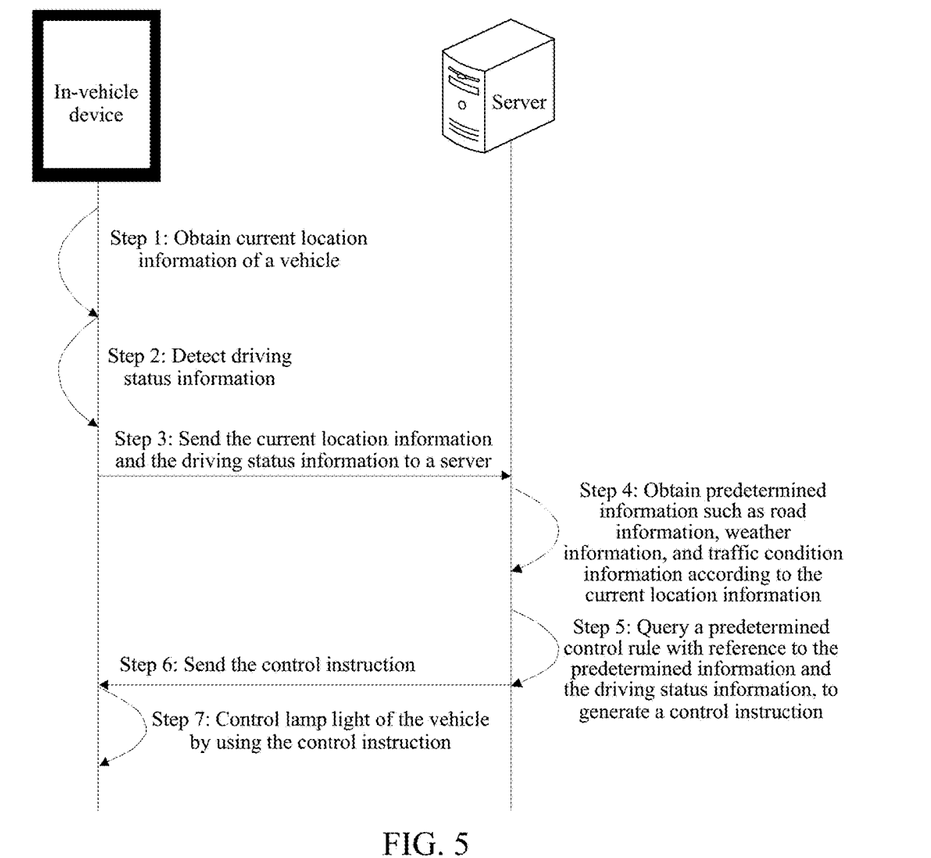
FIG. 5 is a schematic flowchart of a second lamp light control method according to an embodiment.

The following provides a specific example with reference to the foregoing embodiment. As shown in FIG. 5, this example includes:

Step 1: An in-vehicle device obtains current location information of a vehicle. The in-vehicle device herein may be an in-vehicle navigator or an automated driving device, or a lamp light controller, or the like.

Step 2: Detect driving status information. Step 1 and step 2 herein are not performed in a particular order, and may be performed successively, or may be performed at the same time. The driving status information may include: driving statuses such as going straight, making a turn, making a U-turn of a current vehicle.

Step 3: The in-vehicle device sends the current location information and the driving status information to a server.

Step 4: The server obtains predetermined information such as road information, weather information, and traffic status information according to the current location information. The road information may include: information of a road surface type such as a cement road, an asphalt road, or a mud road. The road information further includes information of road conditions, for example, information such as whether a current road surface has pond, or whether the current road surface is flat. The road information may further include a road type such as a curved road, or an intersection. The weather information includes: whether it is a rainy day, foggy day, or sunny day. The traffic status may include information such as whether there is a vehicle from the opposite direction, whether congestion appears at a current time, or a quantity of vehicles neighboring to this vehicle and travelling directions thereof on a current road surface.

Step 5: Query a predetermined control rule with reference to the predetermined information and the driving status information, to generate a control instruction. The query herein may be a query performed by the in-vehicle device in a local database, or the query may be performed by a server on a network side by sending a request, to receive or obtain the control instruction.

Step 6: The server sends the control instruction to the in-vehicle device.

Step 7: The in-vehicle device controls lamp light of the vehicle by using the control instruction.

Figure 6:
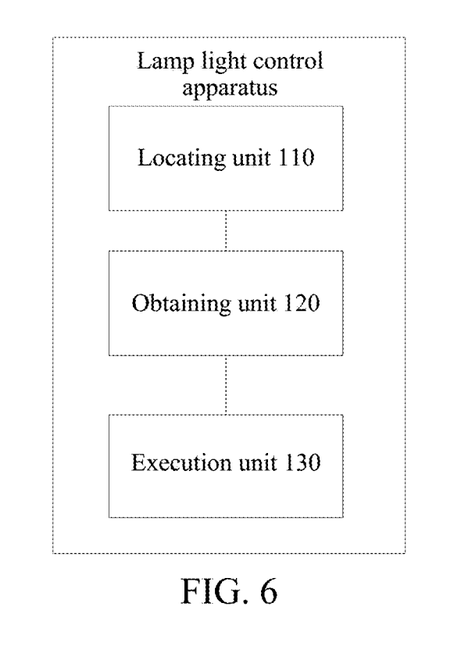
FIG. 6 is a schematic structural diagram of a first lamp light control apparatus according to an embodiment.

As shown in FIG. 6. this embodiment provides a lamp light control apparatus, including:

a locating unit 110, configured to obtain current location information of a vehicle;

an obtaining unit 120, configured to obtain a control instruction determined based on predetermined information and a predetermined control rule, the predetermined information at least including information determined according to the current location information, and the predetermined control rule including a correspondence between the predetermined information and the control instruction; and an execution unit 130, configured to execute the control instruction, to control lamp light of the vehicle.

In this embodiment, the locating unit 110 may be various sensors that can locate, such as a GPS location sensor, or an auxiliary sensor for locating based on a base station. According to some embodiments, the sensor may be a touch-activated type sensor.

The obtaining unit 120 may correspond to a processor and processing circuit. The processor may include an information processing structure such as a central processor unit (CPU), a microcontroller unit (MCU), a digital signal processor (DSP), a programmable logic controller (PLC) or an application processor (AP). The processing circuit may include an application-specific integrated circuit (ASIC).

It may be implemented that the control instruction is generated or determined by executing predetermined code by the processor or processing circuit. The processor or processing circuit may be connected to the storage medium by using a structure such as a bus, to read the predetermined code stored in the storage medium, so as to implement the foregoing operations.

The obtaining unit 120 may further correspond to a communications interface. The communications interface herein may receive the control instruction from another electronic device such as a server.

In a step embodiment, the execution unit 130 may also correspond to the processor or processing circuit, and control bright/dark statuses of lamp light of the vehicle in a wired or wireless manner.

The apparatus provided in this embodiment, may be an onboard in-vehicle device installed on the vehicle, or may be an in-vehicle device that a user carries to the vehicle. The onboard in-vehicle device may be an in-vehicle computer installed onboard on a car. The in-vehicle device that the user carries to the vehicle may include, for example, a mobile phone, tablet computer, or wearable device that the user carries. The execution unit 130 may be an apparatus emitting light to the vehicle, to send various control instructions to control a switch of each lamp light, so as to control the turning on or turning off of various lamp light.

In this embodiment, the apparatus further includes: a detection unit, configured to detect driving status information of the vehicle, where the obtaining unit 120 is configured to obtain an instruction determined based on the predetermined information, the driving status information, and the predetermined control rule.

In this embodiment, the detection unit may correspond to various sensors that can detect a driving status of the vehicle. The sensor can detect a current driving status of the vehicle, to accurately perform lamp light control with reference to the driving status.

In some embodiments, the obtaining unit 120 is configured to query map data according to the current location information, to obtain road information; and query the predetermined control rule according to the road information, to determine the control instruction.

In this embodiment, first, map data is queried according to the current location information to obtain the road information, and then the control instruction is determined according to the road information and a preset control rule. The control instruction formed in this way at least corresponds to a current road form. The road form may include various road forms such as an intersection, a crossing, a bridge, a narrow road, a one-way street, a reversible lane, a ramp way, or a flyover.

In some embodiments, the obtaining unit 120 is configured to determine weather information of a current location of the vehicle according to the current location information; and query the predetermined control rule according to the weather information, to determine the control instruction.

The obtaining unit 120 may determine weather information of a location of the vehicle according to the current location information, and the weather information is information that affects lamp light control of the vehicle.

For example, the predetermined information further includes current time information corresponding to a current location of the vehicle. It may be determined whether it is nighttime or daytime according to the current time information, and if it is nighttime, the vehicle is controlled to turn on at least one lamp light, to prevent collision between vehicles and increase driving safety of the vehicle.

In some embodiments, the obtaining unit 120 is further configured to obtain traffic status information of a location of the vehicle. For example, the obtaining unit 120 may correspond to a communications interface, and may obtain the traffic status information from a network side. The obtaining unit 120 is configured to obtain the control instruction determined based on the predetermined information, the traffic status information, and the predetermined control rule, the predetermined control rule including a correspondence of the predetermined information, the traffic status information, and the control instruction. A traffic status of a current location of the vehicle may affect lamp light control of the vehicle. Therefore, in this embodiment, the obtaining unit 120 may further obtain the traffic status information, to combine the traffic status information with any foregoing information, to control lamp light of the vehicle, so as to implement precise control of vehicle lamp light.

In some embodiments, the apparatus further includes:

a collection unit, configured to collect current illumination information, and the collection unit herein may include: an apparatus such as a brightness sensor that is disposed outside the vehicle and that may collect illumination brightness of a current environment;

the obtaining unit 120, configured to obtain a control instruction determined based on the predetermined information, the illumination information, and the predetermined control rule.

The collection unit may correspond to various sensors that have a brightness collection function, for example, the brightness sensor. At places where brightness is different, the vehicle may need to turn on different lamp light. Therefore, in this embodiment, the apparatus may further obtain the illumination information to generate the control instruction, to improve control precision.

In some embodiments, the obtaining unit 120 is configured to send the current location information to a server, and receive the control instruction determined by the server based on the predetermined information.

In this embodiment, the obtaining unit 120 corresponds to a communications interface, and obtains the control instruction through information exchange with the server.

Figure 7:
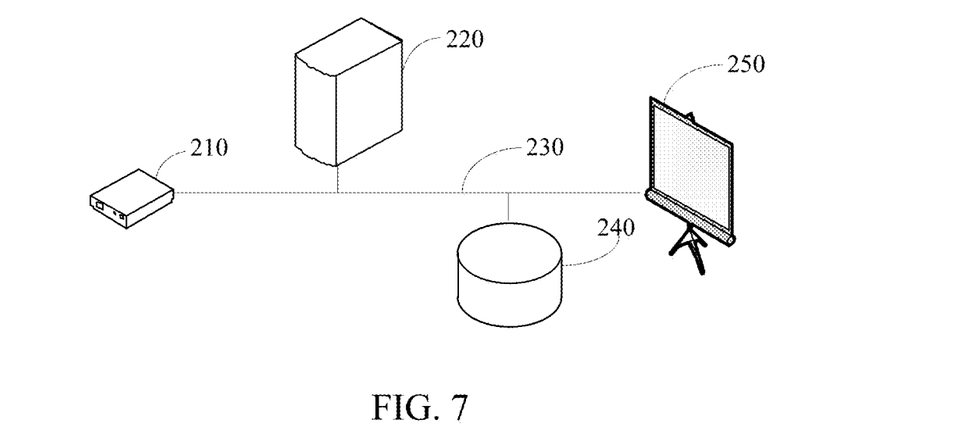
FIG. 7 is a schematic structural diagram of a second lamp light control apparatus according to an embodiment.

As shown in FIG. 7, FIG. 7 shows an in-vehicle device provided in an embodiment of the present disclosure, including a schematic structural diagram of the foregoing lamp light control apparatus, including:

a processor 220, a storage medium 240, and at least one external communications interface 210. The processor 220, the storage medium 240, and the external communications interface 210 are connected to each other by using a bus 230. The processor 220 may be an electronic component having a processing function, for example, a microprocessor, a central processing unit, a digital signal processor, or a programmable logic array. A computer executable instruction is stored in the storage medium 240. The processor 220 executes the computer executable instruction stored in the storage medium 240, to implement any one of the following two solutions. In this embodiment, the storage medium 240 may be various types of storage mediums, for example, an optical disc or a magnetic disk that may be selected as a non-instantaneous storage medium. The apparatus further includes a display 250, where the display is connected to other components by using the bus 230, and may be configured to display various control instructions and/or a lamp light control effect.

An embodiment of the present disclosure further discloses a computer storage medium. The computer storage medium stores a computer executable instruction, and the computer executable instruction is used for performing a lamp light control method that is provided in the foregoing any one or more technical solutions and as the one or more methods shown in FIG. 1, FIG. 2, and FIG. 5.

The computer storage medium may be various types of storage mediums, and may be a removable hard disk, a USB flash drive, a flash drive, a tape or an optical disc that may be selected as a non-instantaneous storage medium.

The following provides a specific example with reference to the any one of the foregoing embodiments.

Example 1

In an example in which a car is driven in a city, because main roads all have road lamps, an automatic headlamp may still sense relatively strong light ray in the evening. Therefore, a car lamp may not be turned on. In this case, the driver who drives the car may see a road condition clearly. However, because a car lamp is not turned on, for drivers of other vehicles, the car may not be seen. As a result, a traffic accident is caused (a familiar scenario such as driving in a rainy day or passing through a tunnel further exists).

In this example, a location of the car may be known based on GPS information such as current location information of the car, and with reference to other data (such as a sunset time, a weather condition, and/or road information of a city), to determine whether a car lamp is required to be turned on at a current time. (For example, if it is daytime, a width lamp is required to be turned on in a heavily rainy day; if it is a rainstorm, an emergency lamp is required to be turned on; if a tunnel is being passed through, a car lamp is required to be turned on; or if it is an evening, a car lamp is required to be turned on).

Example 2

Figure 8:
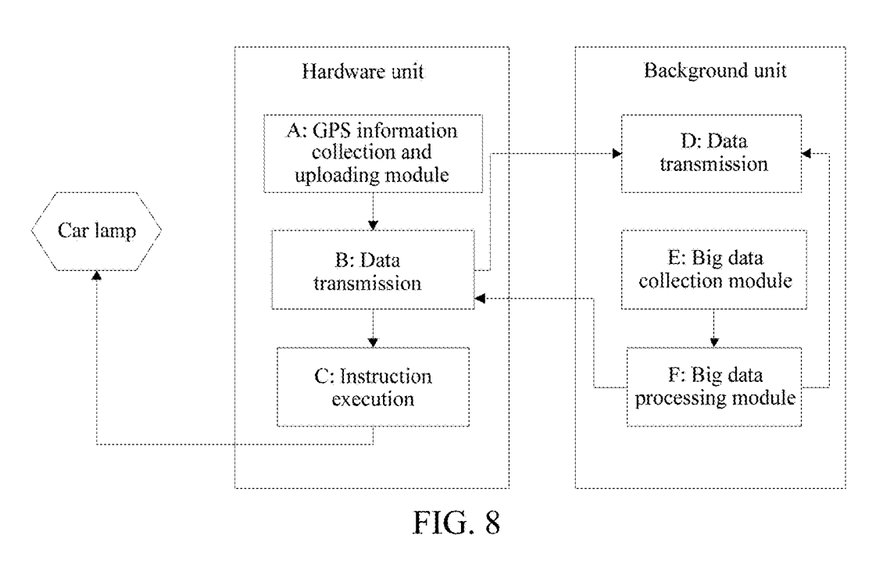
FIG. 8 is a schematic structural diagram of performing a lamp light control method according to an embodiment.

As shown in FIG. 8, this example provides an information processing system for the lamp light control method, including a hardware unit and a background unit. The hardware unit is configured to locate a location of a car, and control lamp light of the car with reference to a control instruction; the background unit is configured to be responsible for receiving the location of the car and collecting related data to be analyzed and determined according to the location of the car, to determine the control instruction and return the control instruction to the hardware unit to perform lamp light control.

The following separately introduces the hardware unit and the background unit.

Hardware Unit A:

a GPS information collection and uploading module that may be hardware integrated in a car, configured to: collect GPS information, and periodically transfer information collected to a transmission module for processing in real time after the car is started. The GPS information herein is one of the foregoing current location information; the current location information may further be location information obtained by another locating manner.

Hardware Unit B:

a data transmission module, configured to: upload and receive data, transfer information to background after receiving the information collected by the GPS information collection and uploading module, listen to the control instruction sent from the background in real time or periodically, and after receiving the control instruction, transfer the control instruction to an instruction execution module to execute the control instruction.

Hardware Unit C:

the instruction execution module, configured to: be responsible for specifically executing the control instruction, and performing an operation (for example, opening a fog lamp, or opening a headlamp) after the data is transmitted from the data transmission module.

Background Unit D:

the data transmission module, configured to be responsible for receiving data transferred from the hardware unit, and after the data is collected, transferring the data to a big data processing module to process the data. Moreover, the data transmission module is responsible for transferring the control instruction processed by the big data processing module to a corresponding hardware data receiving module.

Background Unit E:

a big data collection module, configured to be responsible for collecting data such as weather information, or map information in real time or periodically.

Background Unit F:

the big data processing module, configured to: be responsible for combining GPS information of a car and collected by the hardware unit with data collected by the big data collection module, to calculate and process the data at the same time, so as to generate the control instruction.

The calculation processing is based on a rule, for example:

A time dimension rule: with reference to sunset time, a headlamp of the car is turned on;

A weather dimension rule: in a lightly rainy day, a moderately rainy day, a heavily rainy day, a stormy day, a snowy day, a foggy day or the like, a corresponding width lamp, a headlamp, a fog lamp or blinking twice quickly is respectively and correspondingly turned on; or A map dimension rule: on a bridge, or in a tunnel, the headlamp is turned on.

In addition, the processing rule herein may be extended.

The rule is one of the foregoing predetermined control rules.

After processing data and obtaining an instruction, the processing module transfers, by using the data transmission module of the background unit, the instruction to the car for execution, so as to implement car lamp control.

In conclusion, the car lamp may be controlled more appropriately and effectively with reference to big data information, to prevent a traffic accident caused by wrong or non-timely lamp light control.

In this example, the hardware unit and the background unit may be integrated and disposed in one device, or may be separately disposed in different devices, to perform information exchange through data connection. For example, the hardware unit is disposed in an in-vehicle device, and the background unit may be disposed in a server on a network side. Certainly, in some other embodiments, the in-vehicle device and the background unit may be integrated and disposed in the in-vehicle device.

In the several embodiments provided in this application, it should be understood that the disclosed device and method may be implemented in other manners. The described device embodiments are merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections between the components may be implemented through some interfaces, indirect couplings or communication connections between the devices or units, or electrical connections, mechanical connections, or connections in other forms.

The units described as separation parts may be or may not be physically separated. The part used as display unit may be or may not be a physical unit. That is, the units may be located in a same place, or may be distributed to many network units. Some or all of the units need to be selected according to actual requirements to implement the purpose of the solution of the embodiments.

In addition, functional units in the embodiments of the present disclosure may be all integrated in a processing module, each unit is separately used as a unit, or two or more units are integrated in a unit. The integrated unit may be implemented in a form of hardware, or may be implemented in form of hardware plus a software functional unit.

A person of ordinary skill in the art may understand that, some or all of steps for implementing the method embodiments may be implemented by using hardware related to a program instruction. The program may be stored in a computer readable storage medium. When the program is executed, the steps including the method embodiments are performed. However, the storage medium includes various types of media that may store program code, for example, a mobile storage device, a read-only memory (ROM), a random access memory (RAM), a magnetic disk, or an optical disk.

Alternatively, when the integrated unit of the present disclosure is implemented in a form of a software functional module and sold or used as an independent product, the integrated unit may be stored in a computer-readable storage medium. Based on such an understanding, the technical solutions of the embodiments of the present disclosure essentially, or the part contributing to the existing technology may be implemented in a form of a software product. The computer software product is stored in a storage medium and includes several instructions for instructing a computer device (which may be a personal computer, a server, a network device, or the like) to perform all or some of the methods described in the embodiments of the present disclosure. The foregoing storage medium includes: various media that can store program code, such as a removable storage device, a ROM, a magnetic disk, or an optical disc.

The description above is merely a specific implementation of the present disclosure, but the protection scope of the present disclosure is not limited herein. Modifications made according to the principle of the present disclosure should be understood as fall into the protection scope of the present disclosure. Within the technical scope disclosed in the present disclosure, changes and replacement that may be conceived by any person skilled in the art and familiar with the art should be covered in the protection scope of the present disclosure. Therefore, the protection scope of the present disclosure shall be subject to the protection scope of the claims.

INDUSTRIAL PRACTICABILITY

In the technical solutions provided in the embodiments of the present disclosure, current location information of a vehicle is first obtained, and lamp light control of a vehicle is performed automatically based on predetermined information including at least the current location information and a control instruction determined by a predetermined control rule. First, a driver does not need to manually perform lamp light control, so that workload of the driver is reduced, thereby reducing driving difficulty. Second, a control apparatus automatically controls lamp light of the vehicle according to the predetermined information including the at least the current location information and the predetermined control rule. For manual control, probability of wrong lamp light caused by a human can be reduced, to improve correctness of lamp light handover of the vehicle. This has a positive industrial effect. Meanwhile, a computer executable instruction such as a corresponding computer program may be executed in a control apparatus or an in-vehicle device of the vehicle, to simply implement lamp light control. This has a strong industrial realize-ability feature.

What is claimed is:

1. A lamp light control method, comprising:
obtaining, by a vehicle processor, a current location information of a vehicle;
sending the current location information to a server;
obtaining, by the vehicle processor, a control instruction received from the server, wherein the server is configured to determine the control instruction based on predetermined information determined according to the current location information and a predetermined control rule comprising a correspondence between the predetermined information and the control instruction; and
executing, by the vehicle processor, the control instruction to control operation of a vehicle lamp light.

2. The method according to claim 1, further comprising detecting, by the vehicle processor, driving status information of the vehicle; and
wherein obtaining the control instruction comprises:
obtaining the control instruction based on the predetermined information, the driving status information, and the predetermined control rule.

3. The method according to claim 1, wherein obtaining the control instruction comprises:
querying map data according to the current location information, to obtain road information; and
querying the predetermined control rule according to the road information, to determine the control instruction.

4. The method according to claim 1, wherein obtaining the control instruction comprises:
determining weather information of a current location of the vehicle according to the current location information; and
querying the predetermined control rule according to the weather information, to determine the control instruction.

5. The method according to claim 1, wherein the predetermined information further comprises current time information corresponding to a current location of the vehicle.

6. The method according to claim 1, further comprising:
obtaining traffic status information of a location of the vehicle; and
wherein obtaining the control instruction comprises:
obtaining the control instruction determined based on the predetermined information, the traffic status information and the predetermined control rule, wherein the predetermined control rule comprises a correspondence among the predetermined information, the traffic status information and the control instruction.

7. The method according to claim 1, further comprising:
collecting current illumination information; and
wherein obtaining the control instruction comprises:
obtaining the control instruction determined based on the predetermined information, the illumination information and the predetermined control rule.

8. A lamp light control apparatus, comprising:
a locating unit configured to obtain current location information of a vehicle;
an obtaining unit configured to:
send the current location information to a server; and
obtain, from the server, a control instruction, wherein the server is configured to determine the control instruction based on predetermined information determined according to the current location information and a predetermined control rule comprising a correspondence between the predetermined information and the control instruction; and
an execution unit configured to execute the control instruction, to control lamp light of the vehicle.

9. The apparatus according to claim 8, further comprising:
a detection unit configured to detect driving status information of the vehicle; and
wherein the obtaining unit is configured to obtain the control instruction based on the predetermined information, the driving status information, and the predetermined control rule.

10. The apparatus according to claim 8, wherein the obtaining unit is configured to:
query map data according to the current location information, to obtain road information; and
query the predetermined control rule according to the road information, to determine the control instruction.

11. The apparatus according to claim 8, wherein the obtaining unit is configured to:
determine weather information of a current location of the vehicle according to the current location information; and
query the predetermined control rule according to the weather information, to determine the control instruction.

12. The apparatus according to claim 8, wherein the predetermined information further comprises current time information corresponding to a current location of the vehicle.

13. The apparatus according to claim 8, wherein the obtaining unit is further configured to obtain traffic status information of a location of the vehicle;
wherein the obtaining unit is configured to obtain the control instruction based on the predetermined information, the traffic status information, and the predetermined control rule; and
wherein the predetermined control rule comprises a correspondence among the predetermined information, the traffic status information, and the control instruction.

14. The apparatus according to claim 8, further comprising:
a collection unit, configured to collect current illumination information; and
wherein the obtaining unit is configured to obtain the control instruction determined based on the predetermined information, the illumination information, and the predetermined control rule.

15. An in-vehicle device, comprising:
a processor;
a non-transitory storage medium in communication with the processor, and configured to store processor-executable instructions that, when executed by the processor, cause the processor to:
obtain current location information of a vehicle;
send the current location information to a server;
obtain, from the server, a control instruction, wherein the server is configured to determine the control instruction based on predetermined information determined according to the current location information and a predetermined control rule comprising a correspondence between the predetermined information and the control instruction; and execute the control instruction, to control lamp light of the vehicle.

16. The in-vehicle device according to claim 15, wherein the non-transitory storage medium is further configured to store instructions that, when executed by the processor, cause the processor to:
  detect driving status information of the vehicle; and
  obtain the control instruction based on the predetermined information, the driving status information, and the predetermined control rule.

17. The in-vehicle device according to claim 15, wherein the non-transitory storage medium is configured to store instructions that, when executed by the processor, cause the processor to:
  query map data according to the current location information, to obtain road information; and
  query the predetermined control rule according to the road information, to determine the control instruction.

18. The in-vehicle device according to claim 15, wherein the non-transitory storage medium is further configured to store instructions that, when executed by the processor, cause the processor to:
  obtain traffic status information of a location of the vehicle; and
  obtain the control instruction based on the predetermined information, the traffic status information, and the predetermined control rule; and
  wherein the predetermined control rule comprises a correspondence among the predetermined information, the traffic status information, and the control instruction.

* * * * *